United States Patent
Andjelic

(10) Patent No.: US 9,200,112 B2
(45) Date of Patent: *Dec. 1, 2015

(54) SEMI-CRYSTALLINE, FAST ABSORBING POLYMER FORMULATION

(75) Inventor: Sasa Andjelic, Nanuet, NY (US)

(73) Assignee: Ethicon, Inc., Somerville, NJ (US)

( * ) Notice: Subject to any disclaimer, the term of this patent is extended or adjusted under 35 U.S.C. 154(b) by 984 days.

This patent is subject to a terminal disclaimer.

(21) Appl. No.: 12/538,259

(22) Filed: Aug. 10, 2009

(65) Prior Publication Data

US 2011/0034567 A1 Feb. 10, 2011

(51) Int. Cl.
- C08G 63/02 (2006.01)
- A61K 47/34 (2006.01)
- C08G 63/66 (2006.01)
- C08G 63/08 (2006.01)
- C08G 63/60 (2006.01)

(52) U.S. Cl.
CPC ............... *C08G 63/66* (2013.01); *C08G 63/08* (2013.01); *C08G 63/60* (2013.01); *C08G 2261/126* (2013.01)

(58) Field of Classification Search
None
See application file for complete search history.

(56) References Cited

U.S. PATENT DOCUMENTS

| | | |
|---|---|---|
| 3,942,532 A | 3/1976 | Hunter et al. |
| 3,997,512 A | 12/1976 | Casey et al. |
| 4,048,256 A | 9/1977 | Casey et al. |
| 4,076,798 A | 2/1978 | Casey et al. |
| 4,080,969 A | 3/1978 | Casey et al. |
| 4,095,600 A | 6/1978 | Casey et al. |
| 4,118,470 A | 10/1978 | Casey et al. |
| 4,122,129 A | 10/1978 | Casey et al. |
| 4,343,788 A | 8/1982 | Mustachich et al. |
| 4,435,590 A | 3/1984 | Shalaby et al. |
| 4,438,253 A | 3/1984 | Casey et al. |
| 4,452,973 A | 6/1984 | Casey et al. |
| 4,938,763 A | 7/1990 | Dunn et al. |
| 5,442,033 A | 8/1995 | Bezwada |
| 5,464,929 A | 11/1995 | Bezwada et al. |
| 5,599,852 A | 2/1997 | Scopelianos et al. |
| 5,618,552 A | 4/1997 | Bezwada et al. |
| 5,644,002 A | 7/1997 | Cooper et al. |
| 5,653,992 A | 8/1997 | Bezwada et al. |
| 5,688,900 A | 11/1997 | Cooper et al. |
| 5,696,178 A | 12/1997 | Cooper et al. |
| 5,719,256 A | 2/1998 | Tamai et al. |
| 5,728,752 A | 3/1998 | Scopelianos et al. |
| 5,736,589 A | 4/1998 | Cooper et al. |
| 5,824,333 A | 10/1998 | Scopelianos et al. |
| 6,147,168 A | 11/2000 | Jamiolkowski et al. |
| 6,224,894 B1 | 5/2001 | Jamiolkowski et al. |
| 6,355,772 B1 | 3/2002 | Gruber et al. |
| 6,403,655 B1 | 6/2002 | Bezwada et al. |
| 6,514,517 B2 | 2/2003 | Jamiolkowski et al. |
| 6,716,251 B1 | 4/2004 | Asius et al. |
| 6,932,974 B2 | 8/2005 | Bezwada et al. |
| 7,652,127 B2 | 1/2010 | Andjelic |
| 7,754,233 B2 | 7/2010 | Andjelic et al. |
| 7,868,127 B2 | 1/2011 | Andjelic et al. |
| 7,968,656 B2 | 6/2011 | Andjelic et al. |
| 7,977,403 B2 | 7/2011 | Lohrmann et al. |
| 8,440,215 B2 | 5/2013 | Andjelic et al. |
| 8,575,301 B2 | 11/2013 | Andjelic et al. |
| 2002/0132960 A1* | 9/2002 | Haile et al. ............... 528/272 |
| 2005/0048124 A1 | 3/2005 | Sarangapani |
| 2006/0009839 A1 | 1/2006 | Tan |
| 2006/0051398 A1 | 3/2006 | Andjelic et al. |
| 2006/0263329 A1 | 11/2006 | Eemeta et al. |
| 2006/0263330 A1* | 11/2006 | Emeta et al. ............ 424/78.37 |
| 2008/0055086 A1 | 3/2008 | Cantatore et al. |
| 2008/0103284 A1 | 5/2008 | Andjelic |
| 2008/0103285 A1 | 5/2008 | Andjelic et al. |
| 2008/0243101 A1 | 10/2008 | Andjelic et al. |
| 2009/0104276 A1 | 4/2009 | Andjelic et al. |
| 2009/0239786 A1 | 9/2009 | Stopek |
| 2011/0104227 A1 | 5/2011 | Andjelic et al. |

FOREIGN PATENT DOCUMENTS

| | | |
|---|---|---|
| CN | 1524903 | 9/2004 |
| CN | 1655738 | 8/2005 |
| EP | 0807653 | 11/1997 |
| EP | 1430916 | 6/2004 |

(Continued)

OTHER PUBLICATIONS

Andjelic, S., et al 'Hydrophilic Absorbable Copolyester Exhibiting Zero-Order Drug Release' Pharmaceutical Research (2006) vol. 23, Issue 4 pp. 821-834.
Andjelic, S., et al 'The Polyoxaesters' Polymer International (2007) vol. 56, Issue 9 pp. 1063-1077.
Ko, H.L. et al 'In Vitro and In Vivo Inhibition of Lectin Mediated Adhesion of *Pseudomonas aeruginosa* by Receptor Blocking Carbohydrates' (1987) Infection. vol. 15, Issue 4 pp. 237-240.
Veyries, M-L, et al 'Control of *Staphylococcal* Adhesion to Polymethylmethacrylate and Enhancement of Susceptibility to Antibiotics and Poloxamer 407' Antimicrobial Agents and Chemotherapy. (2000) vol. 44, Issue 4 pp. 1093-1096.
International Search Report dated May 9, 2008 for International Application No. PCT/US2007/082773.
International Search report dated Aug. 31, 2009 for International Application No. PCT/US2009/041280.

(Continued)

*Primary Examiner* — Peter J Reddig
*Assistant Examiner* — Sarah Chickos

(57) ABSTRACT

The present invention relates to a composition comprising a semi-crystalline, absorbable copolymer formulation wherein the first component is hydroxy-capped polycondensation product of diglycolic acid and a mixture of two idols, diethylene glycol (DEG) and ethylene glycol (EG), with DEG added in larger molar amount, and wherein the second component, glycolide is incorporated during the subsequent ring-opening polymerization. The resulting hydrophilic resin has low crystallinity level, glass transition temperature, Tg, slightly below room temperature, and may be particularly useful for making monofilaments, multifilaments, microspheres, or melt blown nonwoven constructs or other medical devices where fast hydrolysis rates and superior mechanical properties are desirable.

18 Claims, No Drawings

(56) References Cited

FOREIGN PATENT DOCUMENTS

| | | |
|---|---|---|
| EP | 1324783 | 3/2006 |
| EP | 1251794 | 2/2007 |
| EP | 1392198 | 5/2008 |
| JP | 52-147691 | 12/1977 |
| JP | 58-040318 | 3/1983 |
| JP | 59-100130 | 6/1984 |
| JP | 59-100131 | 6/1984 |
| JP | 03-014826 | 1/1991 |
| JP | 08-295730 | 11/1996 |
| JP | 10-045885 | 2/1998 |
| JP | 2008-505728 | 2/2008 |
| JP | 2009-535434 | 10/2009 |
| RU | 95113864 | 7/1997 |
| RU | 2232779 | 7/2004 |
| WO | 00/18821 | 4/2000 |
| WO | WO 03/043593 | 5/2003 |
| WO | 03/099169 | 12/2003 |
| WO | WO 2004/030715 | 4/2004 |
| WO | WO 2006/125098 | 11/2006 |
| WO | WO 2006/125099 | 11/2006 |
| WO | WO 2006/125121 | 11/2006 |
| WO | WO 2006/125125 | 11/2006 |
| WO | WO 2008/055086 | 5/2008 |
| WO | WO 2009/042882 | 4/2009 |
| WO | 2009/109306 | 9/2009 |

OTHER PUBLICATIONS

Kawashima, Y. et al 'Preparation of multiple unit hollow microspheres (microballoons) with acrylic resin containing tranilast and their drug release characteristics (in vitro) and floating behavior (in vivo)' Journal of Controlled Release, vol. 16, pp. 279.

Nam, Y.S. et al Protein loaded biodegradable microspheres based on PLGA.

Ouchi, T. et al Encapsulation and/or Release Behavior of Bovine Serum Albumin within and from Polylactide.

Vogt, F.G. et al 'Structural Analysis of Polymorphism and Solvation in Tranilast' Journal of Pharmaceutical Sciences, vol. 94, No. 3 pp. 651.

Golike, R.C. et al 'Crystallization of copolymers of ethylene glycol and diethylene glycol terephthalate' Journal of Polymer Science (1961) vol. 54, Issue 160, pp. 277-285.

Patkar, M. et al 'Effect of diethylene glycol (DEG) on the crystallization behavior of poly(ethylene terephthalate) (PET)' Journal of Applied Polymer Science (1993) vol. 47, Issue 10, pp. 1749-1763.

Seganov, I. et al 'Effect of Diethylene Glycol Content and Annealing Temperature on the Structure and Properties of Poly(ethylene Terephthalate)' Journal of Applied Polymer Science. (1986) vol. 32 pp. 3371-3392.

Yu, T. et al 'The effect of units derived from diethylene glycol on crystallization kinetics of poly(ethylene terephthalate)' Die Makromolekulare Chemie (1986) vol. 187, Issue 11, pp. 2697-2709.

Packhaeuser, C.B. et al 'In situ forming parenteral drug delivery systems: an overview' European Journal of Pharmaceutics and Biopharmaceutics (2004), 58 pp. 445-455.

International Search Report re: PCT/US2008/077889 dated Jan. 5, 2009.

International Search Report dated Oct. 11, 2010 re: PCT/US2010/044836.

International Search Report re: PCT/2010/054020 dated Jul. 8, 2011.

USPTO Advisory Action dated Feb. 27, 2012 in U.S. Appl. No. 11/864,153.

USPTO Final Rejection dated Oct. 25, 2011 in U.S. Appl. No. 11/864,153.

USPTO Non-Final Rejection dated May 9, 2011 in U.S. Appl. No. 11/864,153.

USPTO Restriction Requirement dated Oct. 28, 2010 in U.S. Appl. No. 11/864,153.

U.S. Appl. No. 11/864,153, filed Sep. 28, 2007.

* cited by examiner

SEMI-CRYSTALLINE, FAST ABSORBING POLYMER FORMULATION

FIELD OF THE INVENTION

The present invention relates to a composition comprising a semi-crystalline, absorbable copolymer formulation wherein the first component is hydroxy-capped polycondensation product of diglycolic acid and a mixture of two diols, diethylene glycol (DEG) and ethylene glycol (EG), with DEG added in larger molar amount, and wherein the second component, glycolide is incorporated during the subsequent ring-opening polymerization. The resulting hydrophilic resin has low crystallinity level, glass transition temperature, Tg slightly below room temperature, and may be particularly useful for making fibers, microspheres, or melt blown non-woven constructs or other medical devices where fast hydrolysis rates and superior mechanical properties are desirable.

BACKGROUND OF THE INVENTION

Mechanical properties of a medical device can be made to vary depending on the end use application for the device. For example, it is often desirable for surgical sutures to exhibit mechanical strength, such as straight tensile strength and knot tensile strength. One technique for producing surgical sutures having these desired properties is to utilize polymers having some degree of crystallinity. Specifically, the crystalline or ordered structure of the polymer imparts strength to a medical device produced therefrom, including but not limited to a surgical suture, surgical mesh, surgical staple, haemostatic clip, and the like.

In general, however, the greater the crystallinity of an absorbable polymer, the slower the rate of the absorption will be. Therefore, in those applications where an absorbable medical device is desired, there is a need to balance the level of crystallinity of the polymer against the absorbability thereof. For example, there are certain applications where there is a need for an absorbable medical device to absorb quickly, such as episiotomy and plastic surgical applications, where fast absorption of the medical device is highly desirable to improve patient comfort and to achieve aesthetic outcomes, respectively.

Several approaches to increase the absorption or hydrolysis rate of absorbable polymers are known. For example, one approach is to lower the crystallinity of the polymer to enhance the absorption or hydrolysis rate thereof. This may be done by randomizing the chemical structure of the polymer using, for example, different lactones in the copolymerization step to reduce the overall crystallinity of the polymer. However, the use of lactones to disrupt crystallinity has limited impact due to the considerably higher hydrophobicity of lactone, causing the resultant polymer and medical device to be more hydrophobic, and absorption or hydrolysis to occur more slowly. In addition, lowering the level of crystallinity of the polymer may adversely affect the physical properties of the medical device prepared therefrom.

A second approach to increase the absorption or hydrolysis rate of synthetic absorbable polymers is to add a non-absorbable hydrophilic moiety, e.g. a polyether such as polyethylene glycol (PEG), to increase the hydrophilicity of the absorbable polymer. However, such approach will result in poor mechanical properties of the medical device (e.g. tensile strength and modules) due to the general chemical structure of aliphatic polyethers, and the addition of PEG moieties will reduce the overall crystallinity of the polymers.

A third approach is to use a pre-degraded synthetic absorbable polymer. For example, an absorbable polymer may be subjected to a hydration step or gamma irradiated to initiate the hydrolysis of the absorbable polymer, thereby resulting in a pre-degraded product. However, problems arising with the use of a pre-degraded synthetic absorbable polymer include difficulty in controlling the quality and stability of the pre-degraded polymer. More specifically, it may be difficult to achieve reproducible levels of pre-degradation in the final product.

U.S. Patent Publication 2006/0051398, assigned to Ethicon, Inc., describes a copolyester comprising the reaction product of a polycondensation polyester and at least one lactone, wherein the polycondensation polyester comprises the reaction product of diglycolic acid and/or a derivative thereof and ethylene glycol. The product described in this reference is useful for adhesion prevention. Although this reference indicates that its composition is absorbable, the copolyester described in this reference is fully amorphous with relatively low molecular weight. Therefore, it is not expected that a medical device made from this copolyester will have the requisite physical properties of strength required, for example, for surgical sutures.

U.S. Patent Publication 2008/0103284, assigned to Ethicon, Inc., describes a copolyester comprising the reaction product of a polycondensation polyester and at least one lactone, wherein the polycondensation polyester comprises the reaction product of diglycolic acid and/or a derivative thereof and diethylene glycol. The copolymers described in this patent application have a very blocky glycolide structure, resulting in a relatively high crystallinity level that, in turn, slows the overall hydrolysis rate of a material. Furthermore the copolymers of this patent application exhibit a level of elasticity and strength that may not be desirable for all applications such as for surgical sutures. The application is silent about the possibility to use mixture of diols.

U.S. Pat. No. 5,644,002, also assigned to Ethicon, Inc., describes absorbable polymers and blends of polycondensation polyester and aliphatic polyesters based on lactone monomers, where the polycondensation polyester is the reaction product of diglycolic acid and an alcohol selected from selected from the group consisting of glycerol, pentaerythitol, trimethylolpropane, hydroxyl terminated poly(ethylene glycol)s, ethylene glycol, 1,2-propanediol, 1,3-propanediol, 1,4-butylene glycol, dipropylene glycol, 1,5-pentanediol, 1,6-hexanediol, 1,7-heptanediol, and 1,8-octanediol. The absorbable polymers described in this reference are branched or crosslinked fully amorphous soft materials and as such, are not expected to produce a medical device having the requisite physical properties of strength required, for example, for surgical sutures.

U.S. Pat. Nos. 4,048,256, 4,095,600 and 4,122,129, assigned to American Cyanamid Company, describe biocompatible and absorbable polycondensation polyesters, which are the polycondensation product of diglycolic acid and glycols such as ethylene glycol, diethylene glycol, 1,2-propylene glycol, 1,3-propylene glycol, and the like. Specifically, U.S. Pat. No. 4,095,600 describes a transesterification reaction product of (a) about 2 to 50% by weight of a polycondensation polyester made of diglycolic acid and an unhindered glycol and (b) polyglycolic acid (PGA) of molecular weight above 30,000 Daltons before reaction. Although it is believed that the transesterification reaction product described in this reference exhibits crystallinity, the absorbability thereof is not expected to be very good due to blocky PGA sequences and higher degree of crystal perfection of the copolymers as indicated by the high melting point of the PGA moieties. The term "BLOCKY" as used herein refers to polymeric structures containing many repeating units of the same monomer, for instance, glycolic acid, linked by covalent bonding. Low Inherent Viscosity (IV) values of the copolymers described in these references (lower than 1.0 dL/g), are not expected to yield fibers with good mechanical/tensile properties.

We now disclose a novel polymer formulation based on the reaction product of diglycolic acid and mixture of two diols, diethylene glycol (DEG) and ethylene glycol (EG). When this polycondensation product is reacted in the second, ring-opening stage with a glycolide, a copolymer with lower crystallinity is formed even in formulations containing higher glycolide content. Higher glycolide presence contributes to higher Tg, so the fibers made from this material are likely to exhibit less elasticity.

Therefore, there remains a need for a synthetic absorbable polymer that will achieve faster absorption or hydrolysis, while preserving mechanical strength that is required, for example, for surgical sutures, microspheres and nonwoven constructs.

SUMMARY OF THE INVENTION

Described herein is a composition comprising a co-polyester comprising the reaction product of a polycondensation polyester and at least one lactone, wherein the polycondensation polyester comprises the reaction product of diglycolic acid and/or a derivative thereof with diethylene glycol and ethylene glycol wherein the molar ratio of diethylene glycol to ethylene glycol is in the range from about 2:1 to 4:1; and wherein the co-polyester comprises about 30 to 50% by weight of the polycondensation polyester based on the total weight of the co-polyester and comprises a crystallinity ranging from 10 to 50%.

DETAILED DESCRIPTION

The present invention relates to a composition comprising a semi-crystalline, absorbable copolyester of a polycondensation polyester and at least one lactone, more specifically, a semi-crystalline absorbable copolyester comprising the reaction product of poly(ethylene-co-ethoxyethylene diglycolate) (PEDG-21) and at least one lactone, where the copolyester comprises about 30 to 50% by weight of the poly(ethylene-co-ethoxyethylene diglycolate) based on the total weight of the copolyester.

The schematic presentation of Poly(ethylene-co-ethoxyethylene diglycolate) (PEDG-21) is shown below:

wherein x is from 1 to 2, and n represents the degree of the polymerization, ranging from about 60 to about 300 and corresponding to approximate molecular weights of 10,000 g/mol. to 50,000 g/mol.

In one embodiment of the present invention, the copolyester comprises the reaction product of a polycondensation polymer and at least one lactone, wherein the polycondensation polyester comprises the reaction product of diglycolic acid and/or a derivative thereof with ethylene glycol and diethylene glycol.

In another embodiment, the polycondensation polyester comprises the reaction product of diglycolic acid and/or a derivative thereof, up to about 25 mole percent of an aliphatic diacid based on the total moles of acid, ethylene glycol and diethylene glycol. Specifically, the aliphatic diacid may be an aliphatic alpha-omega dicarboxylic acid, including but not limited to 3,6-dioxaoctanedioic acid, 3,6,9-trioxaundecanedioic acid, and combinations thereof.

The polycondensation polyester may be synthesized by conventional techniques. For example, in a condensation polymerization, diglycolic acid with ethylene glycol and diethylene glycol may be polymerized in the presence of a catalyst at elevated temperatures and reduced pressures. A variety of catalysts may be used, but organometallic compounds have been found to be useful. The catalyst for the polycondensation step of the synthesis is preferably tin based, e.g., stannous octoate. The most desirable catalyst is dibutyltin oxide and is present in the diglycolic acid/diethylene glycol/ethylene glycol monomer mixture at a sufficiently effective molar ratio of monomer to catalyst, e.g., ranging from about 5,000/1 to about 100,000/1. For example, the ratio of 10,000/1 has been found to be quite suitable. The reaction is typically carried out at a temperature range from about 100.degree. C. to about 220.degree. C., preferably from about 140.degree. C. to about 200.degree. C., under an inert atmosphere until esterification of diglycolic acid is complete. Preferably, 180.degree. C. has been found to be a desirable reaction temperature when employing a vertically stirred reactor. It should be noted that the optimum reaction temperature may be reactor and catalyst level dependent but can be found by one having only ordinary skill through the use of experiments. The first stage of the polycondensation reaction (inert gas at atmospheric pressure) is followed by polymerization under reduced pressure until the desired molecular weight and viscosity are achieved.

In the case of fibers, the weight average molecular weight of the polycondensation polymer can range from about 10,000 to about 50,000 g/mol, preferably from about 30,000 to about 50,000 g/mol, most preferably about 40,000 g/mol. This corresponds to an inherent viscosity range from about 0.70 to about 1.2 dL/g. When the molecular weight of the polycondensation polymer is lower than about 20,000 g/mol, the molecular weight of the final copolyester is too low to achieve the desired mechanical properties, for example, for suture applications. Although molecular weight can be increased with increasing reaction time, it becomes increasingly difficult to achieve very high molecular weight. We have found, in general, that a molecular weight of the polycondensation polymer greater than about 50,000 g/mol, is not necessary to achieve desirable properties. One could however envision that this value is not an absolute bar. One might for instance, increase the molecular weight of the polycondensation polymer, and lower the amount of the lactone monomer used in the preparation of the final copolyester.

In the case of microspheres, the weight average molecular weight of the polycondensation polymer can range from about 5,000 to about 15,000 g/mol, preferably from about 8,000 to about 12,000 g/mol, most preferably about 10,000 g/mol. This corresponds to an inherent viscosity range from about 0.30 to about 0.40 dL/g. When the molecular weight of the polycondensation polymer is lower than about 5,000 g/mol, the molecular weight of the final copolyester is too low to achieve the desired mechanical properties. In general, a molecular weight of the polycondensation polymer greater than about 15,000 g/mol is unnecessary to achieve desirable properties. One could however envision that this value is not an absolute bar. One might for instance, increase the molecular weight of the polycondensation polymer, and lower the amount of the lactone monomer used in the preparation of the final copolyester.

In the case of melt-blown non-woven constructs, the weight average molecular weight of the polycondensation polymer can range from about 10,000 to about 40,000 g/mol, preferably from about 20,000 to about 30,000 g/mol, most preferably about 25,000 g/mol. When the molecular weight of the polycondensation polymer is lower than about 10,000 g/mol, the molecular weight of the final copolyester is too low to achieve the desired mechanical properties. In general, a molecular weight of the polycondensation polymer greater than about 40,000 g/mol is unnecessary to achieve desirable properties. One could however envision that this value is not an absolute bar. One might for instance, increase the molecular weight of the polycondensation polymer, and lower the amount of the lactone monomer used in the preparation of the final copolyester.

The schematic presentation of the copolymer, Poly(ethylene-co-ethoxyethylene diglycolate-co-glycolide) (PEDG-21/Gly), is shown below.

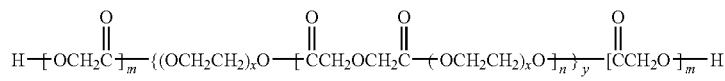

wherein n=y, and m and y (or n) represent the degree of polymerization of glycolide sequences and PEDG-21, respectively and x and n are as defined for PEDG-21. In the event of minimized or minimal transesterification, the overall degree of polymerization of glycolide and PEDG-21 units (2m+y) ranges from about 100 to about 1,600.

Poly(ethylene-co-ethoxyethylene diglycolate) (PEDG-21) is a fully amorphous polycondensation product of diglycolic acid, diethylene glycol and ethylene glycol. When the two diols are used in excess, the resultant polycondensation product contains hydroxyl-capped end groups, and is then capable of serving as a macroinitiator in the subsequent, second stage ring-opening polymerization with a lactone monomer, such as glycolide. When PEDG-21 is reacted with lactone monomers such as glycolide and transesterification reactions are minimized, block glycolide sequences form and the resultant copolyester becomes a crystallizable material. More specifically, this results in a semi-crystalline copolyester, which are properties that are particularly advantageous, for example, in fiber manufacturing processes. Additionally, the crystallization rate of the copolyester is observed to be fast, which is another advantageous property, for example, in fiber manufacturing processes. Finally, both the PEDG-21 and the copolyester product derived therefrom are hydrophilic and fast-absorbing polymers.

The amount of polycondensation polyester used to prepare the copolyester of the present invention ranges from about 30 to 50% by weight based on the total weight of the copolyester.

Suitable lactone monomers that may be reacted with the polycondensation polyester include, but are not limited to, glycolide, lactide (l, d, dl, meso), p-dioxanone, trimethylene carbonate, epsilon-caprolactone, delta-valerolactone, beta-butyrolactone, epsilon-decalactone, 2,5-diketomorpholine, pivalolactone, alpha,alpha-diethylpropiolactone, ethylene carbonate, ethylene oxalate, 3-methyl-1,4-dioxane-2,5-dione, 3,3-diethyl-1,4-dioxan-2,5-dione, gamma-butyrolactone, 1,4-dioxepan-2-one, 1,5-dioxepan-2-one, 1,4-dioxan-2-one, 6,8-dioxabicycloctane-7-one, and combinations of two or more thereof. The preferred lactone monomer includes glycolide.

In one embodiment, the copolyester may comprise the reaction product of a polycondensation polyester such as poly(ethylene-co-ethoxyethylene diglycolate) and a lactone such as glycolide.

In another embodiment, the copolyester may comprise the reaction product of a polycondensation polyester and two or more lactones. For example, the copolyester may comprise the reaction product of the polycondensation polyester, at least 75 mole percent glycolide based on the total moles of lactone, and a second lactone monomer.

The copolyesters of the present invention may be conveniently synthesized by reaction of a dihydroxy poly(alkylene diglycolate) homopolymer or copolymer with a lactone by conventional techniques using conventional processes. For example, the polycondensation polyester is used as an alpha-, omega-dihydroxy macroinitiator in a subsequent ring opening polymerization (ROP) with a lactone or a lactone mixture. The lactone monomers are copolymerized into the polycondensation polyester in the presence of a conventional organometallic catalyst at elevated temperatures. The catalyst for the ROP may be already present as residual catalyst in the polycondensation polyester or may be additional catalyst added in this second step of the synthesis. A suitable catalyst added at the time of the ROP can be an organometallic catalyst. The ring-opening organometallic catalyst is preferably tin based, e.g., stannous octoate, and is present in a sufficiently effective amount in the monomer mixture, preferably at a molar ratio of lactone monomer-to-catalyst ranging from about 20,000/1 to infinity (i.e. no additional catalyst used). Thus one might utilize a tin-IV compound such as dibutyltin oxide at a diacid, for instance, diglycolic acid-to-catalyst ratio of about 10,000/1 to prepare the polycondensation polyester and then add a tin-II compound such as stannous octoate at a lactone-to-added-catalyst molar ratio of about 240,000/1 at the time of the ring opening polymerization. The copolyesters of the present invention may be synthesized alternately with no additional catalyst being added at the time of the ROP.

The ROP step can be immediately conducted in the same reactor as that used to synthesize the polycondensation polyester immediately after the completion of the polycondensation step, if the reactor can provide adequate heat transfer and agitation. The lactone or lactone mixture can be added as a solid, a slurry, or in molten form. Alternately, the ROP can be conducted in a separate reactor at a later date, or in the reactor used for the polycondensation polyester at a later date. If this is the case, the polycondensation polyester is discharged from its reactor and is stored in an environment that minimizes water pick up and hydrolysis. In the case of adding glycolide monomer, the monomer can be added as a solid. The reactor is closed and the pressure reduced. The reactor is usually held under vacuum for a prolonged period of time, for instance overnight, to allow drying. Nitrogen is then introduced into the reactor to bring the pressure to slightly greater than one atmosphere, and the purge cycle repeated for a total of three times. The temperature of the reaction mass is brought up to 130.degree. C. Once at this temperature, the agitator is activated. The temperature is then increased to 150.degree. C. to complete the mixing. This mixing step is essential to produce the copolyesters of the present invention as inadequate mixing tends to allow the formation of homopolymer sequences which can then crystallize to an extent greater than optimum. To ensure that reactants are fully mixed, in-situ spectroscopic probes (such as Near-infrared) can be conveniently used. If additional catalyst is to be added, it is typically added once the batch has been completely mixed. The temperature is quickly brought up to the final reaction temperature, with 210.degree. C. being a most preferred temperature, and held there for typically 2 hours. The exact reaction conditions will depend on the catalyst and its level; final reaction temperatures can vary from about 195.degree. C. to 235.degree. C., and more preferably from about 200.degree. C. to about 220.degree. C. Reaction times can vary from about 30 minutes to a few hours, depending on the catalyst and it level, and is typically conducted until the desired conversion of monomer to polymer is achieved.

An alternate reaction scheme that has been employed to prepare the copolyesters of the invention has involved adding the lactone as a molten stream into the reactor. Thus the polycondensation polyester is added first, typically as a molten stream and the reactor evacuated. The reactor is heated to 130.degree. C. Molten glycolide (or other glycolide rich mixture) at a temperature of 100.degree. C. is added to the reactor. Although the batch temperature drops slightly, it is quickly brought back up to 130.degree. C. at which point mixing is started. At this point, the process that was described above is followed.

Under the above described conditions, the copolyesters of polycondensation polyester and lactones, will typically have a weight average molecular weight of about 15,000 g/mol (a.k.a. Daltons) to about 200,000 g/mol.

In the case where it is desirable for the medical device to exhibit tensile strength such as fibers and filaments, the weight average molecular weight is about 40,000 g/mol to about 200,000 g/mol preferably about 50,000 g/mol to about 80,000 g/mol, and more preferably about 60,000 g/mol to about 80,000 g/mol. These molecular weights are sufficient to provide an effective inherent viscosity, typically between about 1.0 to about 3.0 deciliters per gram (dL/g), preferably about 1.2 to about 2.0 dL/g, more preferably about 1.4 to about 1.8 dL/g, as measured in a 0.1 g/dL solution of hexafluoroisopropanol (HFIP) at 25 degrees C.

In the case of microspheres, the copolyesters of polycondensation polyester and lactones, will typically have a weight average molecular weight of about 15,000 g/mol (a.k.a. Daltons) to about 30,000 g/mol, preferably about 18,000 g/mol to about 28,000 g/mol, and more preferably about 20,000 g/mol to about 26,000 g/mol. These molecular weights are sufficient to provide an effective inherent viscosity, typically between about 0.4 to about 1.0 deciliters per gram (dL/g), preferably about 0.6 to about 0.8 dL/g, more preferably about 0.6 to about 0.7 dL/g, as measured in a 0.1 g/dL solution of hexafluoroisopropanol (HFIP) at 25 degrees C.

In the case of melt-blown nonwoven constructs, the copolyesters of polycondensation polyester and lactones, will typically have a weight average molecular weight of about 25,000 g/mol (a.k.a. Daltons) to about 70,000 g/mol, preferably about 30,000 g/mol to about 60,000 g/mol, and more preferably about 40,000 g/mol to about 55,000 g/mol. These molecular weights are sufficient to provide an effective inherent viscosity, typically between about 0.5 to about 1.8 deciliters per gram (dL/g), preferably about 0.8 to about 1.4 dL/g, more preferably about 1.0 to about 1.3 dL/g, as measured in a 0.1 g/dL solution of hexafluoroisopropanol (HFIP) at 25 degrees C.

The crystallinity of the copolyester described herein, in general, ranges from about 10 to about 50% crystallinity.

In the case where it is desirable for the medical device to exhibit tensile strength such as fiber and filaments, the crystallinity of the copolyester described herein ranges from about 10 to about 40%, preferably from about 20 to about 40%, and more preferably from about 20 to about 30%. In the case of microspheres, the crystallinity of the copolyester described herein ranges from about 10 to about 25% crystallinity, and preferably from about 15 to about 20%. In the case of non-woven constructs, the crystallinity of the copolyester described herein ranges from about 10 to about 50% crystallinity, and preferably from about 20 to about 40%.

The copolyester having the weight average molecular weights described herein may be extruded into fibers or sutures for use in a surgical wound site or trauma site, or used to make other medical devices such as meshes. Alternatively, articles may be molded from the copolyester described herein by various conventional injection and extrusion molding processes. For example, the copolyester may be molded to form, without limitation, sutures, meshes, films, melt-blown non-woven constructs, orthopedic devices and injection molded devices. Alternatively, the copolyester may be a component of a medical device, i.e., the copolyester may form one layer of a multi-laminate hernia repair mesh, or may be suspended in a polymer solution and coated onto at least a portion of a medical device.

EXAMPLE 1

Synthesis of Hydroxy Terminated Poly(Ethylene-Co-Ethoxyethylene Diglycolate) (PEDG-21) Produced Using the Mixture of Two Diols A 5-gallon Benco type reactor with intermeshing patterned blades was employed. After charging the reactor with 6.0 kg of diglycolic acid, 10.7 kg of diethylene glycol (DEG), 2.1 kg of ethylene glycol (EG) (molar ratio of DEG:EG is 75%: 25%), and 1.1 grams of dibutyltin oxide catalyst, the pressure was reduced to below 1 Torr and the vacuum preserved over night. The next day vacuum was released by introducing dry nitrogen (argon can be substituted) and heating of the mixture was started, and the agitator was started and set to 15 RPM in reverse. When the reactor temperature reached 150° C., the agitator speed was reset to 20 RPM in forward direction. Soon first distillate appeared containing mostly water, an esterification by-product. The reaction was continued at 180° C. for about 2 hours until approximately all water was distilled and/or first traces of either DEG or EG appeared in the distillate. After the first nitrogen/argon stage was completed, pressure was lowered gradually to full vacuum while the temperature of the batch was maintained at 180° C. A vacuum of about 200-300 mTorr was maintained throughout the rest of the reaction, a total time of approximately 60 hours. Melt and solution viscosities were regularly checked to ensure polycondensation polyester of a desired molecular weight. The polymerization of hydroxy end-capped polycondensation polyester was completed after 56 hours of reaction time under vacuum. The polymer is kept in the reactor under nitrogen flow until the second, ring-opening stage.

The polycondensation product is a fully amorphous, colorless viscous liquid with a glass transition temperature of −11.0° C. Weight average molecular weight was 32,000 g/mol. NMR analysis indicated that DEG to EG molar ratio was 78 to 22%, respectively.

The schematic presentation of the polymer, Poly(ethylene-co-ethoxyethylene diglycolate) (PEDG-21) is shown below:

$\overline{x}=1.75$; 75% on mole basis when x is 2, and 25% on a mole basis when x is 1 and n=175 which approximately corresponds to PEDG-21 having an average molecular weight of 32,000 g/mol.

EXAMPLE 2

The Copolymerization of an α,ω-Dihydroxy Poly(Ethylene-Co-Ethoxyethylene Diglycolate)Homopolymer with a Lactone Monomer, Glycolide The polycondensation polyester (8.2 kg) produced as described in Example 1 was held in the Benco reactor at room temperature under nitrogen. A stainless steel melt-tank was used to melt the crystalline glycolide, prior to the addition into the reactor. The glycolide (12.3 kg) was charged to the melt-tank, pulled under vacuum, and then heated and held under nitrogen at 120° C. After the polycondensation polyester was heated to approximately 120° C., at which point the molten glycolide monomer was transferred from the melt tank with agitation. No additional catalyst was added in this step of the process. Agitator mixing was continued (20 RPM) and the batch temperature raised to 225° C. for a short period, to assure that there was no PGA "freeze-up". In situ, a real-time Fourier Transform Near-infrared probe was used to confirm complete mixing of components. The temperature was then reduced to 210° C. and the reaction was continued for another two hours.

The discharged co-polyester was semi-crystalline, with a slightly yellow tint. In the next step, the copolymer was sized to approximately 3/16" granules in a rotating knife granulator, sieved to remove fines, and placed in a Patterson-Kelley twin-shell tumble dryer. The resin was subjected to full vacuum at ambient temperature for approx. 18 hours, at which point heat was introduced to the dryer. The dryer was heated to 110° C. for approximately 24 hours with full vacuum (<200 mtorr) at which point the heat was removed, and the vessel allowed to cool to room temperature. The resin was removed from the dryer, placed in vacuum containers and held under vacuum until further use. The sources of tin in Example 2 result in a lactone-to-total-tin-catalyst ratio of about 33,800/1.

The dried resin has a glass transition temperature of 18.0° C., as determined by DSC with the heating rate of 10° C./min. Weight average molecular weight was approximately 60,000 g/mol and an inherent viscosity of 1.60 dL/g, as determined in HFIP at 25° C. at a concentration of 0.1 g/dL, was recorded. The composition was confirmed by H¹NMR to be 40/60 by weight poly(ethylene-co-ethoxyethylene diglycolate-co-glycolide). Melt Index (MI) examination of the resin at 225° C. using the load of 3700 g revealed the value of 0.31 g/10 min.

The schematic presentation of the copolymer, Poly(ethylene-co-ethoxyethylene diglycolate-co-glycolide) (PEDG-21/Gly) is shown below.

wherein m and y (or n) represent the degree of polymerization of glycolide sequences and PEDG-21, respectively; x=1.75, and in the absence of transesterification, the overall degree of the polymerization of the copolymer (2m+y) is approximately 420, which corresponds to an average molecular weight of 60,000 g/mol.

EXAMPLE 3

Analytical Characterization of the Copolymer Produced in Example 2

Differential Scanning Calorimetry (DSC) Measurements.

The dried copolymer resin (7.32 mg) as described in Example 2 was placed into a DSC pan, quenched below −40° C., and heated at the constant heating rate of 10° C./min to determine its crystallization properties. The major melting point, Tm is located at 178° C., with a multiple smaller peaks found at lower temperatures. The heat of fusion, ΔHm, is found to be 25 J/g, which corresponds approximately to 25% of crystallinity. Lower melting point and lower crystallinity level found for this material indicate more randomized glycolide sequences than in copolymers described in US 2008103284A1.

From the second heat measurements (resin was melted and then quenched below −40° C.), we obtained glass transition temperature of 21° C., crystallization peak at 114.5° C. and heat of crystallization, ΔHc, of 16 J/g, followed by subsequent melting temperature of 171.5° C. and heat of fusion, ΔHm of 16 J/g.

Next, the resin was melted at 225° C., and then subjected to controlled cooling rate step (−10° C./min) to determine its crystallization properties upon cooling. The crystallization peak was located at 100° C., with the ΔHc of 22 J/g. These experiments suggest that the produced resin is readily crystallizable, thus suitable for fiber extrusion.

In order to gain preliminary information on potential fiber characteristics, the copolymer resin described in example 2 was extruded through the Melt Index apparatus (at 225° C.), unoriented fiber parts collected, and then subjected to manual cold drawing process until the fibers were fully stretched with an Instron apparatus according to ASTM D5035 and ASTM D5034, the entire disclosures of which are incorporated by references. Pieces of drawn fiber were analyzed by DCS to determine their crystallization properties. It was found that the glass transition temperature of the cold drawn fiber is 20° C., while the broad melting peak is located at 173° C. The heat of fusion, ΔHm is 28 J/g, which corresponds to about 28% crystallinity. Subsequent controlled cooling rate experiments from the melt (rate was −10° C./min) revealed crystallization peak at about 100° C., with ΔHc of 21 J/g. These results are very similar to that of dried resin described earlier, which indicates good stability of the copolymer; specifically, the data suggest that the copolymer morphology stays unchanged after the polymer had been processed in melt index apparatus.

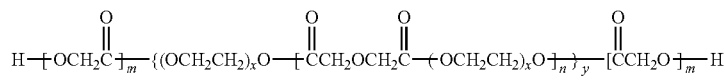

EXAMPLE 4

Comparative Examples

TABLE 1

Physical properties of new PEDG-21/Gly ground, dry and annealed resin

| Composition | Mole ratio of DEG to EG In the prepolymer | Mw (g/mol) | Tg (° C.) | % Crystallinity |
|---|---|---|---|---|
| PEEDG/Gly 40/60 (comparative example) | DEG only | 60,000 | 13 | 40 |
| PEDG/Gly 40/60 (comparative example) | EG only | 26,000 | 21 | 0 |
| PEDG-21/Gly 40/60 (Example 2 of this Invention) | 3:1 | 60,000 | 18 | 25 |

Referring to Table 1, PEEDG/Gly 40/60 copolymer (i.e., copolymer in ratio of 40 weight % PEEDG to 60 weight % glycolide) made from DEG diol alone (first row in Table 1) exhibits high crystallinity (40%) that will slow down hydrolysis rate, and possess relatively low Tg (13° C.), which could make a fiber made from this material a bit elastic (stretchy). This composition is the same composition made in Example 2 of US20080103285, the disclosure of which is incorporated by reference.

Again referring to Table 1, PEDG/Gly 40/60 copolymer (i.e., copolymer in ratio of 40 weight % PEDG to 60 weight % glycolide) made from EG diol alone (second row in Table 1), exhibits no crystallinity (0%). It is fully amorphous, and as such, not useful for any fiber production. This composition is the same composition made in Example 2A of US20060051398, the disclosure of which is incorporated by reference.

further referring to Table 1, the invention, PEDG21/Gly 40/60 copolymer (i.e., copolymer in ratio of 40 weight % PEDG21 to 60 weight % glycolide) made from both diols, DEG/EG, in the molar ratio of 3:1 in the first polycondensation stage of the synthesis, (third row in Table 1 and made according to Example 2 of the present specification), unexpectedly exhibits ideal properties for fast absorbing monofilament applications such as:

Relatively low crystallinity of about 25%, ensuring good dimensional stability and strength, while not slowing down hydrolysis too much;

Tg of about 18° C. (close to room temperature), considerably reducing elasticity of fibers made from this material;

Relatively high Tg (18° C.) of this copolyester will aid in processing, fiber extrusion due to less stickiness (tackiness) of the resin From prior work of applicant in this area involving the use of DEG alone and EG alone as reactants with diglycolic acid such as disclosed in US20080103285 and US20060051398, the following observations were made:

a) If the copolymer composition contains more than 70% of glycolide, it becomes very difficult to make monofilaments because of high Tg (high stiffness) of the material. However, multifilaments would be relatively easy to make.

b) If the composition contains considerably less than 60% of glycolide (e.g. 50/50 composition), the Tg would be low enough, so that the produced fibers will be too elastic as demonstrated by high elongation-to-break values (50-80%) observed for PEEDG/Gly copolymers as determined by tensile testing using an Instron apparatus according to ASTM D5035 and ASTM D5034, the entire disclosures of which are incorporated by references.

c) If the mole ratio of DEG to EG in the prepolymer is less than 2:1 (e.g. 1.5:1), it would be expected that in most compositions a fully amorphous polymer would result, which is not suitable for fiber production.

d) Finally, if the mole ratio of DEG to EG in the prepolymer is considerably larger than 4:1 (e.g. 5:1), the amount of EG in the structure would be probably too low to produce any measurable effect (on reducing crystallinity), so the resin would behave as PEEDG/Gly copolymers.

Thus, the following trends for various embodiments would be expected for the copolymers of this invention and thus are used to form the appropriate ranges and expected properties of the novel copolymers.

1. Higher glycolide content—higher Tg and higher crystallinity of the copolymer
2. Higher Tg—fiber less elastic (i.e., less stretchy); however, if Tg is considerably above room temperature, monofilaments would be too stiff
3. Higher crystallinity—slower absorption rate
4. The preferred crystallinity range for fiber applications is from 20 to 30%, below 20% the fiber may not be dimensionally stable, above 30% monofilaments may be slow to hydrolyze; and
5. Higher content of EG in the prepolymer (i.e., lower DEG:EG ratio)—lower crystallinity of the copolymer and slightly higher Tg (PEDG has higher Tg than PEEDG)

Therefore, the compositions of this invention are characterized by crystallinity levels no higher than 50%, a glass transition temperature, Tg, slightly below or at room temperature, and are expected to be useful for making monofilaments, multifilaments, microspheres, or melt blown nonwoven constructs or other medical devices where fast hydrolysis rates and superior mechanical properties are desirable. Therefore, the following approximate reactant and/or physical property ranges for compositions of this invention are those wherein the molar ratio of diethylene glycol to ethylene glycol is in the range from about 2:1 to 4:1 and preferably from 2.5:1 to 3.5:1 for fiber applications; and wherein the co-polyester comprises about 30 to 50% by weight of the polycondensation polyester based on the total weight of the co-polyester; and wherein the copolymers of this invention comprise crystallinity levels ranging from 10 to 50%, preferably from about 20 to about 40% crystallinity for non-woven constructs, preferably from about 20 to 30% crystallinity for fiber embodiments, and preferably from about 15 to 20% crystallinity for microsphere embodiments.

Additionally the compositions of this invention may further comprise therapeutic agents and active substances, including without limitation, antiinfectives, such as antibiotics, antimicrobial agents (e.g. lauric arginate, Diiodomethyl-p-tolyl sulfone, silver and silver compounds, 2,4,4'-Trichloro-2'-Hydroxydiphenyl Ether or combination thereof) and antiviral agents; analgesics and analgesic combinations; anorexics; antihelmintics; antiarthritics; antiasthmatic agents; anticonvulsants; antidepressants; antidiuretic agents; antidiarrheals; antihistamines; antiinflammatory agents; antimigraine preparations; antinauseants; antineoplastics; antiparkinsonism drugs; antipruritics; antipsychotics; antipyretics, antispasmodics; anticholinergics; sympathomimetics; xanthine derivatives; cardiovascular preparations including calcium channel blockers and beta-blockers such as pindolol and antiarrhythmics; antihypertensives; diuretics; vasodilators, including general coronary, peripheral and cerebral; central nervous system stimulants; cough and cold preparations, including decongestants; hormones, such as estradiol and other steroids, including corticosteroids; hypnotics; immunosuppressives; muscle relaxants; parasympatholytics; psychostimulants; sedatives; tranquilizers; naturally derived or genetically engineered proteins, polysaccharides, glycoproteins, or lipoproteins; oligonucleotides, antibodies, antigens, cholinergics, chemotherapeutics, radioactive agents, osteoinductive agents, cystostatics heparin neutralizers, procoagulants and hemostatic agents, such as prothrombin, thrombin, fibrinogen, fibrin, fibronectin, heparinase, Factor X/Xa, Factor VII/VIIa, Factor IX/IXa, Factor XI/XIa, Factor XII/XIIa, tissue factor, batroxobin, ancrod, ecarin, von Willebrand Factor, collagen, elastin, albumin, gelatin, platelet surface glycoproteins, vasopressin, vasopressin analogs, epinephrine, selectin, procoagulant venom, plasminogen activator inhibitor, platelet activating agents and synthetic peptides having hemostatic activity.

Although this invention had been shown and described with respect to detailed embodiments thereof, it would be understood by those skilled in the art that various changes in form and detail thereof may be made without departing from the spirit and scope of the claimed invention.

What is claimed is:

1. A co-polyester comprising the reaction product of a polycondensation polyester and at least one lactone monomer, wherein the polycondensation polyester comprises the reaction product of diglycolic acid and/or a derivative thereof with diethylene glycol and ethylene glycol wherein the molar ratio of diethylene glycol to ethylene glycol is in the range from about 2:1 to 4:1; wherein the at least one lactone monomer comprises at least 75 mole percent glycolide based on the total moles of lactone monomers, and a lactone monomer selected from the group consisting of lactide (l, d, dl, meso), p-dioxanone, trimethylene carbonate, epsilon-caprolactone, delta-valerolactone, beta-butyrolactone, epsilon-decalactone, 2,5-diketomorpholine, pivalolactone, alpha,alpha-diethylpropiolactone, ethylene carbonate, ethylene oxalate, 3-methyl-1,4-dioxane-2,5-dione, 3,3-diethyl-1,4-dioxan-2,5-dione, gamma-butyrolactone, 1,4-dioxepan-2-one, 1,5-dioxepan-2-one, 1,4-dioxan-2-one, 6,8-dioxabicyclooctane-7-one, and combinations thereof; and wherein the co-polyester comprises about 30 to 50% by weight of the polycondensation polyester based on the total weight of the co-polyester and comprises a crystallinity ranging from about 10 to 50%.

2. The co-polyester composition according to claim 1, wherein the at least one lactone is glycolide.

3. The co-polyester composition according to claim 1, wherein the polycondensation polyester comprises the reaction product of diglycolic acid and/or a derivative thereof, up to about 25 mole percent of an aliphatic diacid based on the total moles of acid, and total moles of diols.

4. The co-polyester composition according to claim 1, wherein the weight average molecular weight of the co-polyester is from about 15,000 to about 200,000 g/mol.

5. The co-polyester composition according to claim 1, wherein the molar ratio of diethylene glycol to ethylene glycol is in the range from about 2.5:1 to 3.5:1, the weight average molecular weight of the co-polyester is from about 50,000 to about 80,000 g/mol, and the crystallinity ranges from about 20 to about 30%.

6. The co-polyester composition according to claim 1, wherein the weight average molecular weight of the co-polyester is from about 15,000 to about 30,000 g/mol, and the crystallinity ranges from about 10 to about 25%.

7. The co-polyester composition according to claim 1, wherein the weight average molecular weight of the co-polyester is from about 25,000 to about 70,000 g/mol, and the crystallinity ranges from about 10 to about 50%.

8. The co-polyester composition according to claim 1, further comprising therapeutic agents and active substances.

9. A medical device, wherein said medical device or a component thereof is made from a co-polyester composition according to any of the claims 1-8.

10. The medical device of claim 9, wherein the medical device is made from said co-polyester composition and is selected from the group consisting of sutures, meshes, films, melt-blown nonwoven constructs, orthopedic devices and injection molded devices.

11. The medical device of claim 9, wherein the device is a microsphere made from said co-polyester composition.

12. The medical device of claim 10, wherein the device is a suture.

13. The medical device of claim 10, wherein the device is a mesh.

14. The medical device of claim 10, wherein the device is a melt-blown nonwoven construct.

15. The medical device of claim 10, wherein the device is an orthopedic device.

16. The medical device of claim 10, wherein the device is an injection molded device.

17. The medical device of claim 9, wherein the medical device is a multi-laminate hernia repair mesh, and the co-polyester composition forms one layer of the multi-laminate hernia repair mesh.

18. The medical device of claim 9, wherein the co-polyester composition is a coating on at least a portion of a medical device.

* * * * *